United States Patent
Murayama et al.

[19]

[11] Patent Number: 5,941,471
[45] Date of Patent: Aug. 24, 1999

[54] CLUTCH MECHANISM FOR A DOUBLE BEARING TYPE REEL FOR FISHING HAVING AN ERGONOMIC THUMB ACTUATED OPERATIONAL MEMBER

[75] Inventors: Tomohiro Murayama, Kouchi; Nobuyuki Yamaguchi, Tokyo, both of Japan

[73] Assignee: Daiwa, Seiko, Inc., Tokyo, Japan

[21] Appl. No.: 08/925,739

[22] Filed: Sep. 9, 1997

[30] Foreign Application Priority Data

Sep. 10, 1996  [JP]  Japan .................................. 8-239177

[51] Int. Cl.⁶ ....................................................... A01K 89/00
[52] U.S. Cl. ............................................ 242/261; D22/141
[58] Field of Search ..................................... 242/261, 283, 242/310; D22/140, 141

[56] References Cited

U.S. PATENT DOCUMENTS

| | | | |
|---|---|---|---|
| D. 273,221 | 3/1984 | Iinuma | D22/141 |
| D. 281,188 | 10/1985 | Shohoji et al. | D22/140 |
| D. 294,624 | 3/1988 | Iinuma et al. | D22/141 |
| D. 300,166 | 3/1989 | Myojo | D22/140 |
| 2,251,168 | 7/1941 | Ronnick | 242/283 |
| 4,222,537 | 9/1980 | Noda | 242/261 X |
| 4,512,536 | 4/1985 | Sato | 242/261 |

FOREIGN PATENT DOCUMENTS 8-10394   4/1996   Japan .

*Primary Examiner*—Donald P. Walsh
*Assistant Examiner*—Emmanuel Marcelo
*Attorney, Agent, or Firm*—Liniak, Berenato, Longacre & White

[57] ABSTRACT

A double bearing type reel for fishing in which a series of operations from changing over the clutch to thumbing can be smoothly, quickly and easily conducted. A clutch changeover operation member is provided to conduct a changeover operation of the clutch mechanism by being displaced in the longitudinal direction of the reel. The operational member is arranged at a position at which the clutch changeover operation member can be operated by a finger tip of a thumb when the thumb is extended diagonally from a hand of a fisher man who holds the reel body. A finger setting section is arranged in the operation member in the direction of diagonally extending thumb of the hand of the fisher man holding the reel body in such a manner that the finger setting section diagonally cross the longitudinal direction of the reel body, so that the operation member for changing over the clutch is operated when the thumb is set in the finger setting section.

3 Claims, 5 Drawing Sheets

CLUTCH MECHANISM FOR A DOUBLE BEARING TYPE REEL FOR FISHING HAVING AN ERGONOMIC THUMB ACTUATED OPERATIONAL MEMBER

BACKGROUND OF THE INVENTION

The present invention relates to a double bearing type reel for fishing in which a clutch mechanism is changed over between the fishing line winding state and the fishing line unwinding state by a changeover member.

In general, a double bearing type reel for fishing is composed as follows. There is provided a spool between the right and the left side plate of the reel body. The spool shaft is rotatably supported by bearings arranged on both side plates. The spool shaft is connected to a handle shaft via a clutch mechanism. There is provided a clutch changeover lever in the reel body, and the clutch mechanism is changed over by the clutch changeover lever, so that the rotational characteristic of the spool can be changed over between the fishing line winding state and the fishing line unwinding state.

In this connection, Japanese Unexamined Patent Publication No. 8-103194 discloses the following technique. In order to enhance the operational property of this double bearing type reel for fishing, there is provided a clutch changeover lever in an upper portion of the side plate on which the handle is located, so that the clutch changeover lever can be operated by one hand of a fisher man who holds the overall reel with the hand. According to the above arrangement, while the overall reel is stably held by one hand, it is possible to conduct the operation of the clutch changeover lever and the operation of thumbing by a thumb of the hand holding the overall reel. Also, it is possible to operate the handle by the other hand. Therefore, it is possible to continuously, quickly and easily conduct a series of operation of winding and unwinding the fishing line.

However, in the above double bearing type reel for fishing, the operational member to change over the clutch is composed of a plate-shaped member, and one end portion on the protruding side is bent into an L-shape, and this bent portion is protruded outside from the side frame of the reel body so as to form a finger contact section. That is, this finger contact section is formed by bending a flat plate-shaped member into an L-shape. Therefore, the finger contact section is only a flat surface.

In this connection, the operation lever to change over the clutch is displaced in the longitudinal direction. When this operation lever to change over the clutch is operated, a thumb of a fisher man to operate the lever is set only on a flat surface of the finger contact section. Accordingly, a thumb of a hand to operate the lever tends to slip on the flat surface of the finger contact section. Accordingly, it is necessary for the operator to displace the clutch changeover operation lever in the longitudinal direction while the thumb is strongly pressed against the surface of the finger contact section so that the thumb can not slip on the surface of the finger contact section of the clutch changeover operation lever. Therefore, when the clutch changeover operation is conducted, an unnatural force must be given to the thumb, and further a special attention must be given. Accordingly, it is difficult to operate the lever, and the thumb of the operator tends to get tired.

Further, in the above arrangement, a surface of the finger contact section of the clutch changeover operation lever is separate from the peripheral portion of the flange of the spool, and a direction of the finger contact section is different from that of the peripheral portion of the flange of the spool. Due to the foregoing, when the thumbing operation is conducted after the clutch has been changed over, the thumb must be replaced to the thumbing position, that is, the thumb must be replaced with a clear intention of replacing. In other words, an unnatural movement and attention must be given to the thumb in the process of changing from the clutch changeover operation to the thumbing operation. Therefore, when the operation is changed to the thumbing operation, it is difficult and further the thumb tends to get tired.

For the same reasons, when the operation is changed from the clutch changeover operation to the thumbing operation, an unnatural operation must be conducted, that is, there is an unnatural operation in the process of changing from the clutch changeover operation to the thumbing operation. Accordingly, there is a possibility that a beginner makes a failure in operation of the reel for fishing. Especially, in the process from casting to thumbing, it is impossible to cast a lure accurately, and a phenomenon of backlash tends to occur.

For the above reasons, it is desirable to further improve the property of clutch changeover operation conducted by the thumb.

SUMMARY OF THE INVENTION

The present invention has been accomplished to solve the above problems. It is an object of the present invention to provide a handy double bearing type reel for fishing in which a clutch can be easily and positively changed over and a series of operation from changing over the clutch to thumbing can be smoothly, quickly and easily conducted.

The invention provides a double bearing type reel for fishing comprising: a reel body; a spool shaft, both ends of which are supported by the reel body; a spool mounted on the spool shaft; a handle attached to the reel body, by which the spool is rotated; a clutch mechanism to change over a drive force given by the handle between the fishing line winding state and the fishing line unwinding state; an operational member to conduct a changeover operation of the clutch mechanism by being displaced in the longitudinal direction of the reel, arranged at a position at which the operational member can be operated by a finger tip of a thumb when the thumb is extended diagonally from a hand of a fisher man who holds the reel body; and a finger setting section arranged in the operational member in the direction of diagonally extending thumb of the hand of the fisher man holding the reel body in such a manner that the finger setting section diagonally cross the longitudinal direction of the reel body, wherein the operational member for changing over the clutch is operated when the thumb is set in the finger setting section.

In the double bearing type reel for fishing, one end edge of the finger setting section of the operational member to change over the clutch mechanism is arranged at a position close to a peripheral edge of the flange of the spool. Therefore, immediately after the clutch has been changed over, the spool can be easily subjected to the operation of thumbing by the abdomen of the thumb. Therefore, the performance of casting can be enhanced.

In the double bearing type reel for fishing, a handle to rotate the spool is arranged on the side of the reel body on which the operational member to change over the clutch mechanism is arranged. Accordingly, a series of operation from casting to thumbing and further the operation of the handle to wind a fishing line can be smoothly and naturally conducted.

In the double bearing type reel for fishing, a finger contact recess in which the operational member to change over the clutch mechanism is arranged is provided on an outer surface of the reel body.

DETAILED DESCRIPTION OF THE PREFERRED EMBODIMENTS

Figure 1:
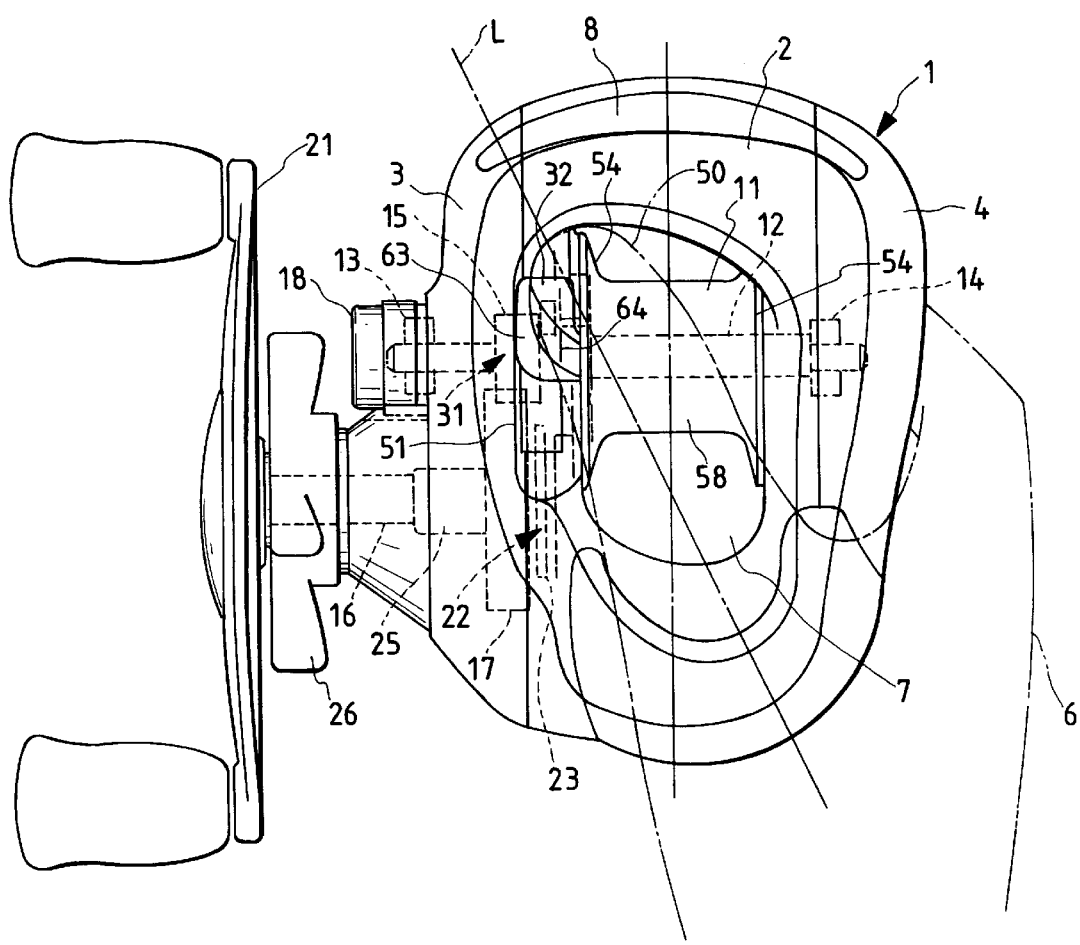
FIG. 1 is a plan view of the double bearing type reel for fishing of the first embodiment.
Figure 2:
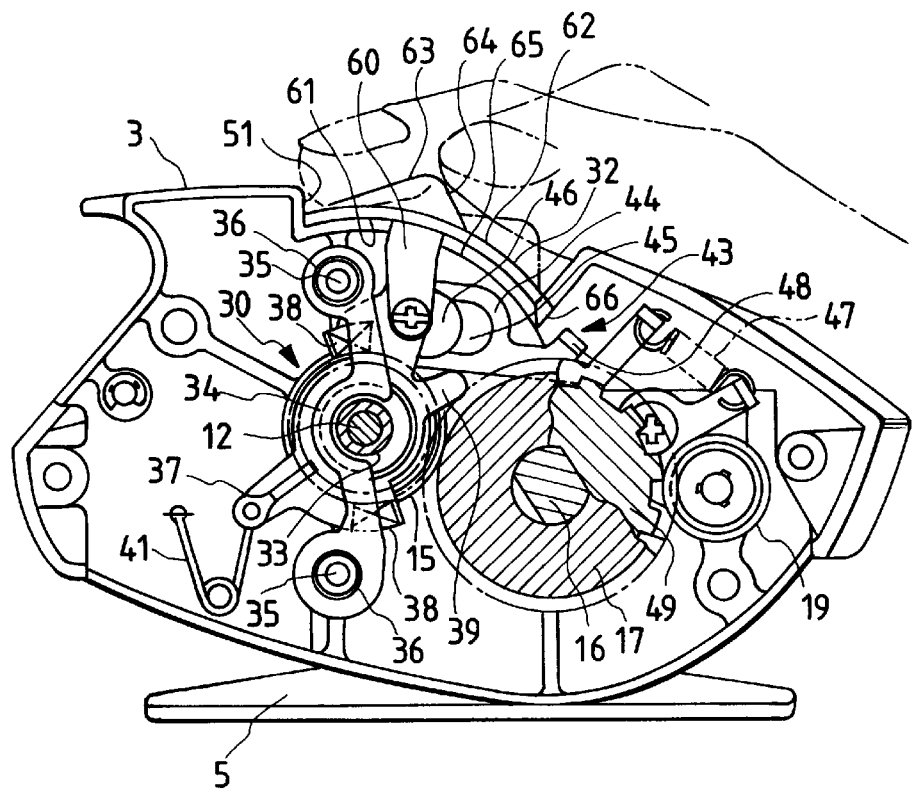
FIG. 2 is a longitudinal cross-sectional view of the reel taken on a line passing through a portion close to the clutch mechanism of the double bearing type reel for fishing of the first embodiment.
Figure 3:
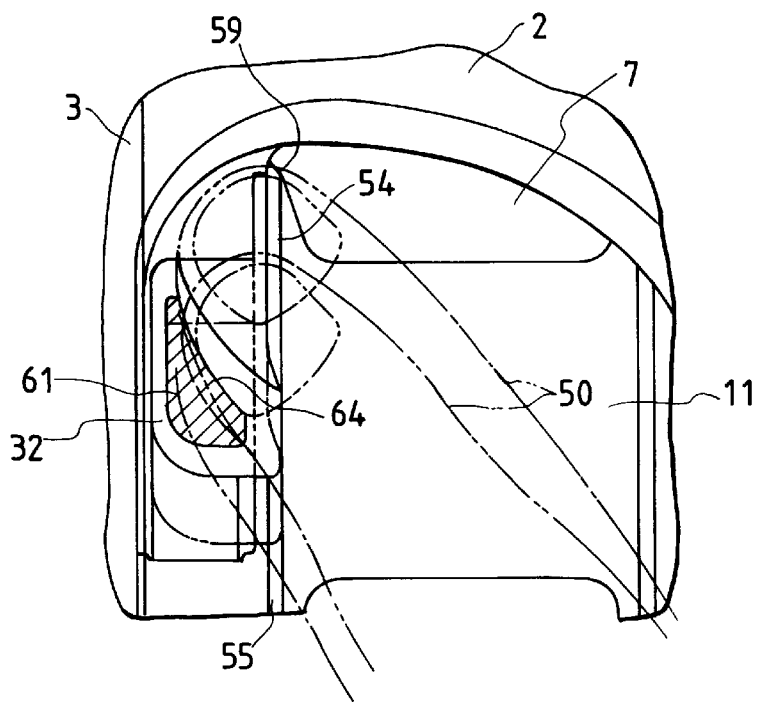
FIG. 3 is a plan view of a portion close to the clutch changeover operation member of the double bearing type reel for fishing of the first embodiment.
Figure 4:
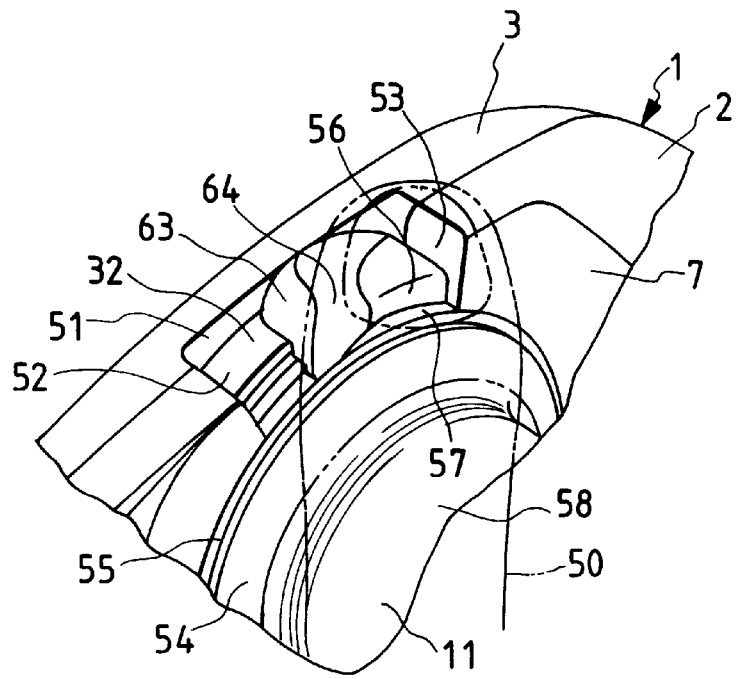
FIG. 4 is a perspective view of a portion close to the clutch changeover operation member in the fishing line winding state of the double bearing type reel for fishing of the first embodiment.
Figure 5:
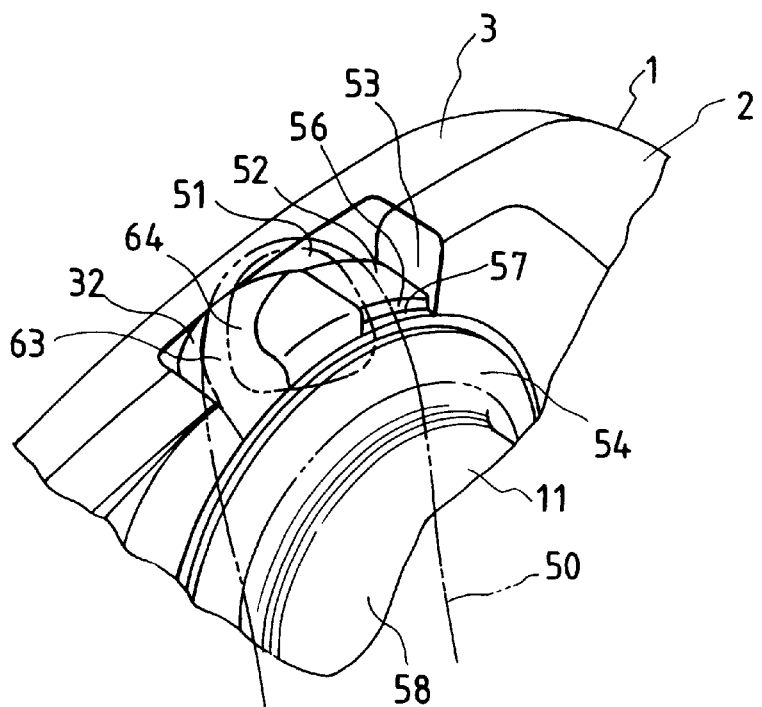
FIG. 5 is a perspective view of a portion close to the clutch changeover operation member in the fishing line unwinding state of the double bearing type reel for fishing of the first embodiment.

Referring to FIGS. 1 to 5, a double bearing type reel for fishing of the first embodiment of the present invention will be explained as follows. FIG. 1 is a plan view of the reel, FIG. 2 is a longitudinal cross-sectional view of the reel taken on a line passing through a portion close to the clutch mechanism, FIG. 3 is a plan view of a portion close to the clutch changeover operation member, FIG. 4 is a perspective view of a portion close to the clutch changeover operation member in the fishing line winding state, and FIG. 5 is a perspective view of a portion close to the clutch changeover operation member in the fishing line unwinding state.

In FIG. 1, reference numeral 1 is a reel body. The reel body 1 is composed of a frame 2, a left side frame 3 and a right side frame 4, wherein the left side frame 3 and the right side frame 4 are attached onto both sides of the frame 2. The reel body 1 is composed of a curved surface, the upper surface of which is flat and the front portion of which is gradually raised. Surfaces on both sides are formed into curved surfaces slightly expanding outside. Therefore, the overall reel body 1 is formed into a substantial egg-shape which can be easily held by one hand. A rod mounting member 5 is integrally attached onto a lower surface of the frame 2 of the reel body 1. Under the condition that a fishing rod not shown is attached to the rod mounting member 5, the entire reel body 1 including the fishing rod can be held by one hand, that is, the entire reel body 1 including the fishing rod can be naturally held by the right hand 6 as shown by the two-dotted chain line in FIG. 1. On an upper surface of the reel body 1, there is provided an opening 7 used for the operation of thumbing. On the front side of the reel body 1, there is provided an opening 8 used for unwinding the fishing line.

There is provided a spool 11 between the left side frame 3 and the right side frame 4 of the reel body 1. A spool shaft 12 is fixed to the spool 11. Both end portions of the spool shaft 12 are rotatably supported by bearings 13, 14. A pinion 15 is idly and rotatably engaged with the left end portion of the spool shaft 12 while the pinion 15 is capable of sliding in the axial direction. The spool shaft 12 and the pinion 15 are detachably connected with each other by a clutch mechanism 31 described later. The pinion 15 is always meshed with a drive gear 17 mounted on the handle shaft 16. Both end portions of the spool shaft 12 are respectively supported by thrust bearings not shown in the drawing. In the left side frame 3, there is provided an adjusting knob 18 to adjust an intensity of contact force of the thrust bearing which receives the left end of the spool shaft 12. Due to the foregoing, a mechanical brake mechanism is composed, by which the rotation of the spool 11 can be lightly braked.

As shown in FIG. 2, the drive gear 17 mounted on the handle shaft 16 is meshed with a drive gear 19 of a level winding mechanism not shown arranged at a position close to the opening 8 used for unwinding the fishing line on the front side of the reel body 1. In this case, the level wind mechanism is the same as that commonly used.

As shown in FIG. 1, there is provided a handle 21 at the outside protruding end of the handle shaft 16. The handle shaft 16 can be rotated by this handle 21. The handle shaft 16 is engaged with a one way clutch 22 which allows a rotation of the handle 21 only in the winding direction. In this case, the one way clutch 22 is of a ratchet type composed of a ratchet wheel 23 and engaging claws not shown. However, it is also possible to use a rolling type one way clutch.

The drive gear 17 mounted on the handle shaft 16 is idly engaged with the handle shaft 16, so that it can be freely rotated. Torque given to the handle shaft 16 is transmitted to the drive gear 17 via a drag mechanism 25. The drag mechanism 25 includes a frictional disk and a ring spring to push the frictional disk. In the drag mechanism 25, drag adjustment is conducted by a drag adjustment knob 26 which is coaxially arranged between the left side of the reel body 1 and the handle 21.

In the left side frame 3 of the reel body 1, there is provided a clutch mechanism 31 by which the spool 11 can be selectively put into a state of free rotation. This clutch mechanism 31 is changed over by a clutch changeover operation member 32 arranged on an upper surface of the left edge portion of the opening 7 used for thumbing operation of the reel body 1.

This clutch mechanism 31 connects the spool shaft 12 with the pinion 15 inserted into it, or alternatively the clutch mechanism 31 disconnects the spool shaft 12 from the pinion 15. The specific structure of the clutch mechanism 31 will be described below. The clutch mechanism 31 includes: a pinion 15 idly engaged with the spool shaft 12 so that the pinion 15 can be rotatably slid in the axial direction; a clutch engaging section (not shown) arranged in the middle of the spool shaft 12, engaged with the pinion 15 when it moves in the direction of one end of the spool shaft; and a slide operation mechanism 30 to move this pinion 15 in the axial direction of the spool shaft 12. The slide operation mechanism 30 moves the pinion 15. Therefore, it is possible to make a selection between the following two states. One is a state of connection in which the clutch engaging section is engaged with the pinion 15, so that the spool shaft 12 and the pinion 15 can be integrated into one body, and the other is a state of disconnection in which the clutch engaging section is disengaged from the pinion 15, so that the spool shaft 12 and the pinion 15 can be disconnected from each other. The slide operation mechanism 30 includes a clutch operation plate 34, the intermediate portion of which is engaged with a peripheral groove 33 formed on an outer circumference of a portion of the pinion 15. Both end arms of this clutch operation plate 34 are supported by a shaft pin 35 protruding from the left frame 3, so that this clutch operation plate 34 can be slid along the spool shaft 12 in the axial direction. The clutch operation plate 34 is pushed by a pushing spring 36 provided around the shaft pin 35. Therefore, the pinion 15 is moved in a direction so that the clutch can be connected.

There is provided a rotational cam 37 round the spool shaft 12. At the peripheral edge of the rotational cam 37, there is formed a cam surface 38 having an inclined surface capable of engaging with both end arm portions of the clutch operation plate 34. When the rotational cam 37 is rotated clockwise at the position shown in FIG. 2 at which the clutch is in a state of ON, the clutch operation plate 34 is pushed by the cam surface 38, which is inclined, against a pushing force of the pushing spring 36. Therefore, the clutch operation plate 34 is moved in a direction so that the clutch can be disconnected. Due to the foregoing, the clutch engaging section of the spool shaft 12 is disconnected from the pinion 15. Since the clutch is turned off as described above, torque of the drive gear 17 mounted on the handle shaft 16 is not transmitted to the spool shaft 12 via the pinion 15, and the spool 11 can be freely rotated together with the spool shaft 12. In this state, the clutch is turned off. The rotational cam 37 is rotated by the rotational operation of the clutch changeover operation member 32 fixed to the rotational cam 37.

The rotational cam 37 is connected with a director spring 41. One end of the director spring 41 is attached to the rotational cam 37, and the other end of the director spring 41 is attached to a member of the reel body 1. Due to the above arrangement, the state of the clutch can be selected between ON and OFF by the action of the director spring 41, that is, a toggle mechanism is formed in the above arrangement.

There is provided a clutch return mechanism 43 by which the rotational cam 37 is changed over from the state of OFF to the state of ON. This clutch return mechanism 43 includes a return plate 44, at the base end portion of which a long hole 45 is formed. Into this long hole 45, a support shaft 46 composed of a rivet attached to a member of the reel body 1 is slidably inserted, so that the return plate 44 can be rotatably and slidably held. One end of the tension spring 47 is attached to the fore end portion of the return plate 44. The other end of the tension spring 47 is attached to a member of the reel body 1. By the action of the tension spring 47, the return plate 44 is rotated clockwise in FIG. 2 and further moved to the right. At the center of the return plate 44, there is provided an engaging protrusion 48. This engaging protrusion 48 is meshed with a ratchet gear 49 fixed to the handle shaft 16. When the return plate 44 returns against a pushing force of the tension spring 47, the base end comes into contact with a contact portion (not shown) of the rotational cam 37, so that the rotational cam 37 can be rotated counterclockwise.

In the state shown in FIG. 2 in which the clutch is turned on, a contact portion 39 formed on the rotational cam 37 comes into contact with a lower end of the return plate 44, and the return plate 44 is retracted from the ratchet gear 49 against a force of the tension spring 47. However, when the rotational cam 37 is rotated clockwise and the clutch is turned off, the contact portion 39 of the rotational cam 37 is separated from the return plate 44. Therefore, the return plate 44 is moved to the right while it is rotated clockwise by a force of the tension spring 47. Accordingly, the engaging protrusion 48 of the return plate 44 is meshed with the tooth portion of the ratchet gear 49. When the handle 21 is rotated in the winding direction under the above condition, the ratchet gear 49 is engaged with the engaging protrusion 48 of the return plate 44, so that the return plate 44 is pushed and moved to the left. Then, the base end of the return plate 44 comes into contact with the contact portion (not shown) of the rotational cam 37, so that the rotational cam 37 can be rotated counterclockwise. Then, by the function of the director spring 41, the rotational cam 37 is changed over into the state of ON of the clutch shown in FIG. 2, and this state is maintained. As described above, the clutch mechanism 31 used for the spool is changed over from the state of OFF to the state of ON by the winding operation of the handle 21. Also, it is possible to change over the clutch mechanism 31 from the state of OFF to the state of ON when the rotational cam 37 is directly rotated by the clutch changeover operation member 32.

Next, the profile and the structure of the clutch changeover operation member 32 of the clutch mechanism 31 used for the spool will be explained as follows. As shown in FIG. 1, the clutch changeover operation member 32 is arranged at a position where an abdomen of the finger tip of the thumb 50 of the right hand 6 is naturally located so as to operate the clutch changeover operation member 32 when the entire reel body 1 is held by one hand, in this case, by the right hand 6. That is, it is a portion on an upper surface of the edge located on the left of the opening 7 used for the operation of thumbing of the reel body 1. In this portion, there is provided a finger contact recess 51 in which the clutch changeover operation member 32 is arranged. This recess 51 has a circumferential bottom surface 52 formed coaxially with the spool shaft 12. This recess 51 is formed into a long groove-shape which is long in the longitudinal direction of the reel body 1. The right side of the recess 51, in which the operation member is arranged, is open to the opening 7 used for the operation of thumbing, so that a side opening 53 communicating with the opening 7 used for the operation of thumbing can be formed. At the edge of this side opening 53, there is provided a step portion 56 along the circumferential edge 55 of the flange 54 of the spool 11. A bottom surface 57 of the step portion 56 is close to the circumferential edge 55 of the flange 54 so that the height substantially coincides with the height of the circumferential edge 55 of the flange 54. At the circumferential edge 55 of the flange 54, there is formed an inclined finger contact plane 59 which is gradually inclined toward the winding barrel portion 58 of the spool 11.

The clutch changeover operation member 32 includes: a base portion 62, the lower surface of which slides along a curved surface of the bottom 52 of the recess 51; and a finger setting section 63 protruding onto the upper surface side of this base portion 62. As shown in FIG. 2, a connecting arm is protruded from the lower surface of the base portion 62. The clutch changeover operation 32 is connected with the rotational cam 37 via this connecting arm 60. On the bottom surface 52 of the recess 51, there is formed a groove hole 65 into which the connecting arm 60 is inserted. At one end of the bottom surface 52 of the recess 51, there is formed a hole 66 through which the base portion 62 is retracted.

The clutch changeover operation member 32 is arranged round the spool shaft 12 in such a manner that it can be moved in the longitudinal direction of the reel body 1. In this case, a finger contacting surface 64 of the finger setting section 63 of the clutch changeover operation member 32 is arranged in a direction in which the thumb 50 of the right hand 6 holding the reel body 1 extends diagonally, in such a manner that the finger contact surface 64 diagonally crosses the longitudinal direction of the reel body 1. In other words, as shown in FIG. 1, this finger contacting surface 64 is formed in a direction of the thumb 50, which extends naturally, when the entire reel body 1 is held by the right hand 6, wherein this finger contacting surface 64 is inclined substantially along the center line L of the thumb 50. A finger tip of the thumb 50 is entirely set in a portion located from the front upper surface of the base portion 62 of the clutch changeover operation member 32 to the finger contacting surface 64. The finger tip of the thumb 50 is set in such a manner that it closely adheres onto the surface. An inclination of the finger contacting surface 64 of the finger setting section 63 in the height direction is formed in such a manner that the front end side is withdrawn in the pushing direction, and its cross-section is formed like a slope of a mountain. A surface on the fisherman's side opposite to the finger contacting surface 64 of the finger setting section 63 is formed perpendicularly to its top, so that it can be easily pushed by a finger when the clutch change-over operation member 32 is moved to the front. When the clutch changeover operation member 32 is moved to the front by a finger, the finger is set in the recess 51, that is, the finger is accurately positioned. Therefore, the operation can be easily and positively carried out.

In this connection, when the finger tip of the thumb 50 is contacted with the surface of the reel body 1, it naturally falls into the finger contact recess 51. Therefore, the finger tip comes into contact with the inclined finger contact surface 64 of the finger setting section 63. Accordingly, the finger tip can be naturally accommodated in the space formed in the recess. For the above reasons, when the fisherman holds the reel body 1 with his hand, the finger tip of the thumb 50 of the hand is naturally set at a position where the finger tip comes into contact with the clutch changeover operation member 32. Accordingly, it is possible to start a stable fishing operation positively and quickly.

An edge portion of the finger contact surface 64 of the finger setting section 63, with which the finger tip of the thumb 50 comes into contact, has a smooth edge portion, and also a side edge of the side opening 53 communicating with the opening 7 for the operation of thumbing on the upper surface of the base portion 62 is smooth. These smooth edge portions fall onto the step portion 56 side of the recess 51. A side wall surface of the side opening 53 substantially coincides with a side end surface of the flange 54 of the spool 11. A bottom surface 57 of the step portion 56 is close to the circumferential edge 55 of the flange 54, so that the height of the bottom surface 57 is substantially the same as that of the circumferential edge 55 of the flange 54. Since one end edge of the finger setting section 63 of the clutch changeover operation member 32 is located at a position close to the circumferential edge 55 of the flange 54 of the spool 11, the abdomen of the finger tip of the thumb 50, which has been set in the finger setting section 63 of the clutch changeover operation member 32, is also located at a position very close to the circumferential edge 55 of the flange 54 of the spool 11. Accordingly, when the finger tip of the thumb 50 to operate the clutch changeover operation member 32 is a little moved toward the spool 11, it is possible to put the finger tip on the flange 54. That is, immediately after the completion of the operation of turning off the clutch, it becomes possible to conduct a thumbing operation naturally without moving the thumb 50 greatly. Consequently, it is possible to naturally conduct a series of operation from the changeover of the clutch to the thumbing.

Therefore, when the double bearing type reel for fishing is actually used, as shown in FIG. 1, the reel body 1 is held in such a manner that the right portion of the reel body 1 is set in the right hand 6. In the actual fishing operation, a fishing rod attached to the lower portion of the reel body 1 is held together with the reel body 1 by the right hand 6. Then, the thumb 50 of the right hand 6 is naturally set in a diagonal posture as shown in FIG. 1. Therefore, when the reel body 1 is held by the right hand 6, the finger tip of the thumb 50 of the right hand 6 is necessarily set in the finger setting section 63 of the clutch changeover operation member 32. Due to the foregoing, it is possible to positively and easily operate the clutch changeover operation member 32. In the case of casting, when the finger tip of the thumb 50 to operate the clutch changeover operation member 32 is a little moved toward the spool 11, it is possible to set the finger tip on the flange 54 of the spool 11. Therefore, immediately after the completion of the operation of turning off the clutch, it becomes possible to conduct a thumbing operation naturally without moving the thumb 50 greatly. Therefore, the thumbing operation can be conducted smoothly. When there was a tug on the fishing line in the middle of unwinding the fishing line, it is necessary to stop unwinding the fishing line. In the above case, the finger is set at a top or a rising surface on the fisherman's side of the finger setting section 63 of the clutch changeover operation member 32, and the clutch changeover operation member 32 is pushed back to the front side, so that the clutch can be put into the state of ON and the fishing line can be stopped from unwinding.

When the handle 21 arranged on the left of the reel body 1 is rotated with the left hand, the fishing line can be wound round the spool 11. In this connection, the handle 21 may be arranged on the right of the reel body 1, however, it is necessary to hold the reel body 1 with the left hand in this case.

Figure 6:
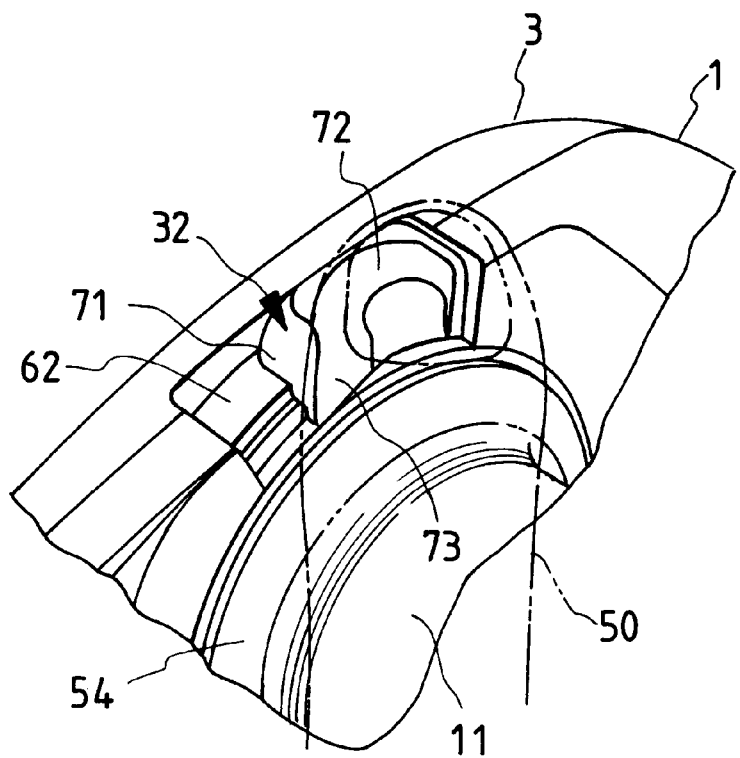
FIG. 6 is a perspective view showing a portion close to the clutch changeover operation member in the fishing line winding state of the double bearing type reel for fishing of the second embodiment.
Figure 7:
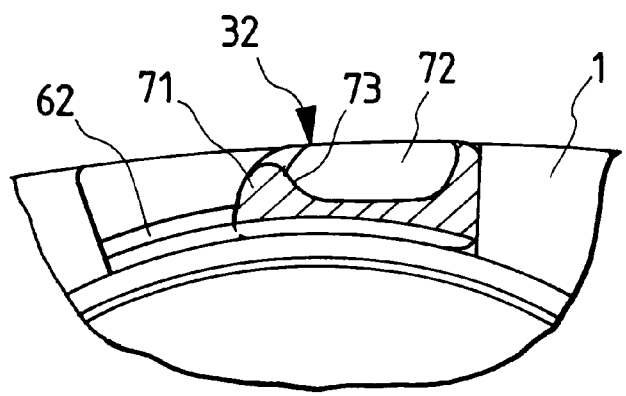
FIG. 7 is a longitudinal cross-sectional view showing a portion close to the clutch changeover operation member of the double bearing type reel for fishing of the second embodiment.

FIGS. 6 and 7 are views showing the second embodiment of the present invention. FIG. 6 is a perspective view showing a portion close to the clutch changeover operation member, and FIG. 7 is a longitudinal cross-sectional view showing a portion close to the clutch changeover operation member. These views shows a variation of the clutch changeover operation member 32. On an upper surface of the base portion 62, there is provided a protruding portion 71 in which a recess is formed. This recess 72 in the protruding portion 71 forms the finger setting section 63. A portion of the recess 72 on the spool 11 side is open so that it communicates with the opening 7 used for the operation of thumbing. An inside wall surface of the recess 72 forms the finger contact surface 73 inclined in the same manner as described before. That is, the finger contact surface 73 of the recess 72 is substantially inclined along the center line L of the thumb 50 which is naturally positioned when the entire reel body 1 is held by the right hand 6.

In this second embodiment, the height of the clutch changeover operation member 32 is the same as the depth of the recess 51. Therefore, the upper surface of the clutch changeover operation member 32 substantially coincides with the outer surface of the reel body 1.

In this embodiment, the finger setting section 63 is composed of the recess 72, and positioning is conducted when the finger tip of the thumb 50 is inserted into the recess 72. Accordingly, it is difficult for the thumb 50 to disengage from the finger setting section, that is, the thumb 50 can be positively set in the setting section. When the clutch changeover operation member 32 is moved to the front side, it is possible to move it without separating the thumb from the recess 72. As described above, since positioning is conducted in such a manner that the finger tip of the thumb 50 is inserted into the recess 72, it is possible to smoothly move the clutch changeover operation member in the longitudinal direction. Since the clutch changeover operation member 32 is composed in such a manner that the height of the clutch changeover operation member 32 is substantially the same as the depth of the recess 51. Accordingly, the upper surface of the clutch changeover operation member 32 coincides with the outer surface of the reel body 1, that is, the upper surface of the clutch changeover operation member 32 does not protrude outside greatly. Therefore, it is possible to prevent the fishing line from being caught, so that the occurrence of malfunction can be prevented.

Figure 8:
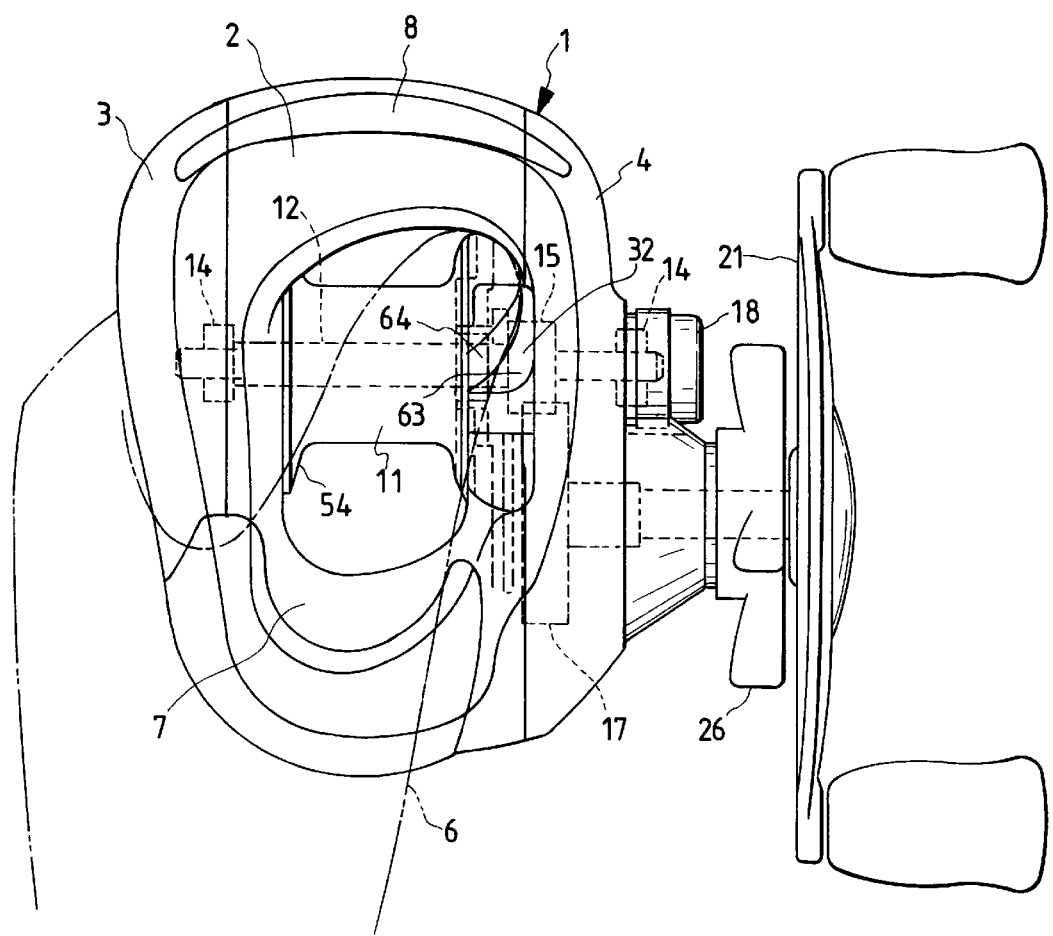
FIG. 8 is a plan view of the double bearing type reel for fishing of the third embodiment.

FIG. 8 is a view showing the third embodiment of the present invention. FIG. 8 is a plan view of the reel. In the third embodiment, the handle is attached onto the right, and the fundamental structure is the same as that of the first embodiment in which the handle is attached onto the left, wherein the positional relation of each portion of the third embodiment is reverse to that of the first embodiment.

As explained above, according to the present invention, when the reel body is held by a hand of a fisherman, the finger tip of the hand is naturally caught on the finger contact surface of the finger setting section of the clutch changeover operation member. Accordingly, it is possible to naturally position and keep the thumb at its operating position without making efforts. It is unnecessary for a fisherman to give a strong force to the thumb so that the thumb can not be separated from the operating position. The finger tip of the thumb can be naturally caught by the clutch changeover operation member. Therefore, it is unnecessary for the fisherman to give an unnatural force and special attention. Accordingly, the burden imposed on the thumb can be lightened, and the thumb is not fatigued. It is possible for the fisherman to immediately operate the clutch changeover operation member when the thumb is located at the operating position. Therefore, the operation of changeover of the clutch can be positively, stably and smoothly conducted.

According to the invention, one end edge of the finger setting section of the operating member is arranged at a position close to the circumferential edge of the flange of the spool. Accordingly, only when the finger tip is moved a little onto the spool side after the completion of the clutch changeover operation, the finger tip can be set on the flange of the spool. Therefore, the abdomen of the thumb can start a thumbing operation immediately and smoothly, so that the casting performance of the reel can be enhanced. That is, a series of operation from turning off the clutch to casting and thumbing can be stably and smoothly conducted. Therefore, in the operation from casting to thumbing, the lure can be accurately cast to a predetermined point, and further a phenomenon of backlash of the fishing line is not caused. In the process of transition from the operation of casting to the operation of thumbing, the operation can be easily carried out, so that the burden imposed on the thumb can be lightened, and the thumb is not fatigued.

According to the invention, the handle is arranged on the side of the reel body on which the clutch changeover operation member is provided. Accordingly, a series of operation from casting to thumbing, and further an operation of the handle for winding the fishing line can be smoothly and naturally conducted.

According to the invention, on the outer surface of the reel body, there is provided a finger contact recess in which the clutch mechanism changeover operation member is arranged. Consequently, the finger to operate the clutch mechanism changeover operation member can be positioned more easily. Further, the finger setting section of the clutch mechanism changeover operation member can be arranged at a position close to the circumferential edge of the flange of the spool.

What is claimed is:

1. A double type reel for fishing comprising:

a reel body having a pair of spaced apart side frame members;

a spool shaft, both ends of which are supported by the reel body;

a spool provided on the spool shaft, said spool being disposed between said side frame members and rotatable with respect to the reel body;

a handle attached to the reel body for operating the spool to rotate;

a clutch mechanism for changing over a condition of the spool between a fishing line winding state wherein a drive force is transmitted from the handle to the spool to wind a fishing line thereon and a fishing line unwinding state wherein the spool is allowed to rotate freely so that the fishing line can be delivered therefrom;

an operational member disposed between said side frame members displaceable in a longitudinal direction of the reel body to conduct a changeover operation of the clutch mechanism, the operational member being arranged at a position at which the operational member can be operated by a finger tip of a thumb when the thumb is extended diagonally from a fisher man's hand holding the reel body;

a connection member disposed between said clutch mechanism and said operational member to form a connection therebetween; and a finger setting section arranged in the operational member, the finger setting section substantially extending substantially along the thumb of the fisher man's hand holding the reel body and in a direction diagonal to the longitudinal direction of the reel body so that the finger setting section ergonomically receives the thumb of the fisher man's hand during operation of the operational members;

wherein said operational member comprises a bottom surface and a radially outwardly extending step portion, said bottom surface being arranged at a position radially proximate and adjacent an outer circumferential edge of a flange of said spool, said finger setting section being formed in said step portion of said operation member, and said step portion extending outward from said connection member substantially adjacent one of said side frame members and disposed between said one side frame member and said flange of said spool.

2. A double bearing type reel for fishing according to claim 1, wherein the handle and the operational member are arranged on the laterally same side of the reel body with respect to the spool.

3. A double bearing type reel for fishing according to claim 1, wherein a finger contact recess is provided on an outer surface of the reel body, the operational member being arranged in the finger contact recess.

* * * * *